Sept. 13, 1960  T. J. REESE  2,952,475
LOAD TRANSFERRING TRAILER HITCH
Filed Nov. 24, 1958  2 Sheets-Sheet 1
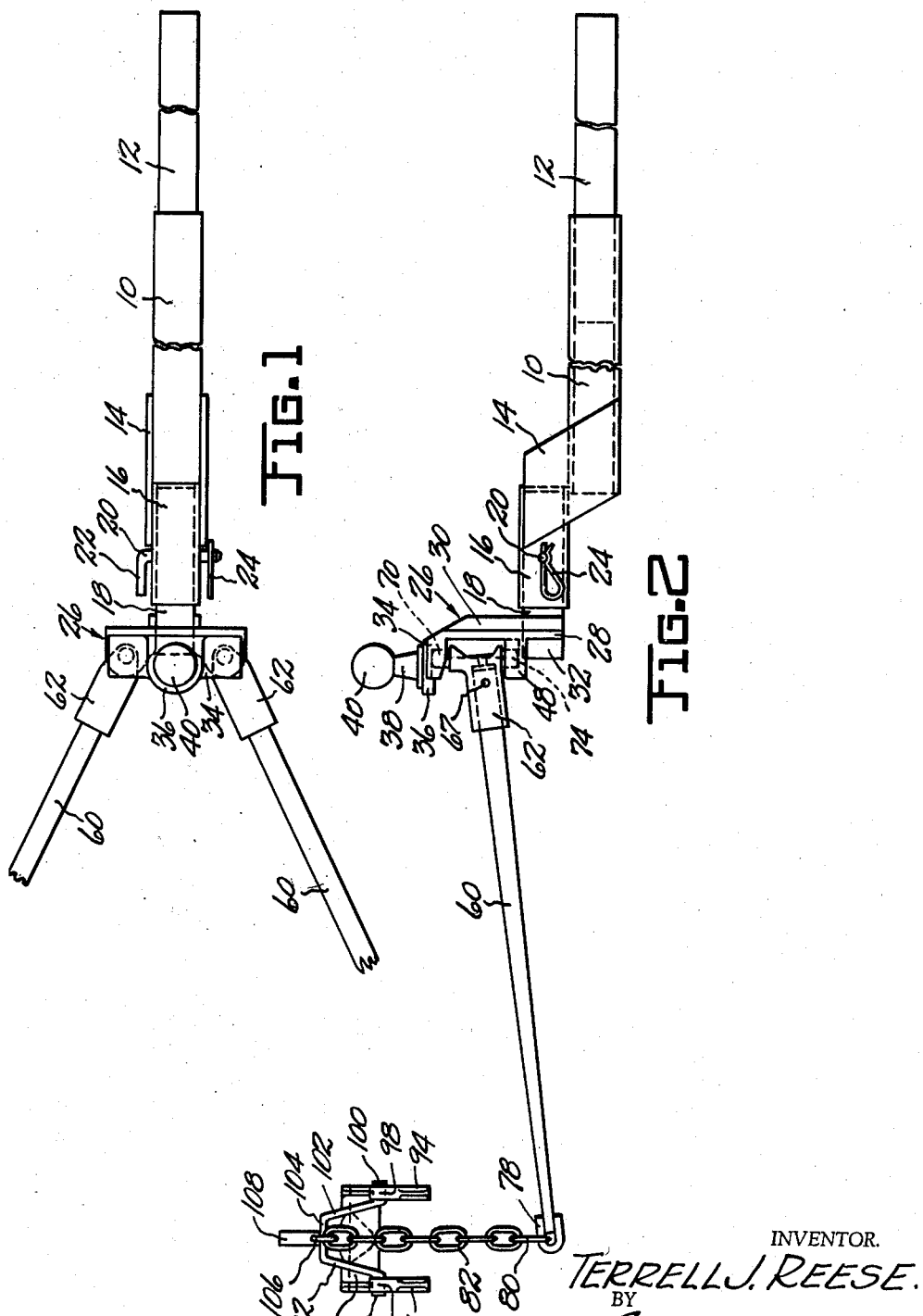
INVENTOR.
TERRELL J. REESE.
BY
Eugene C. Knoblock
ATTORNEY Sept. 13, 1960
T. J. REESE
2,952,475
LOAD TRANSFERRING TRAILER HITCH
Filed Nov. 24, 1958
2 Sheets-Sheet 2
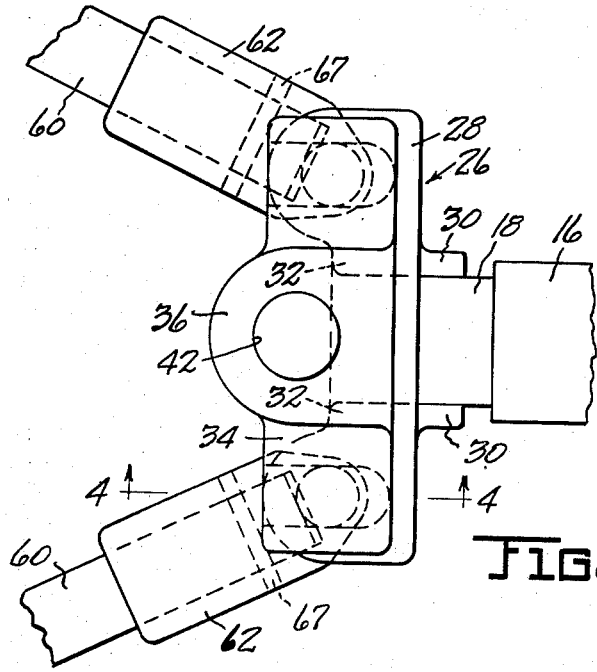
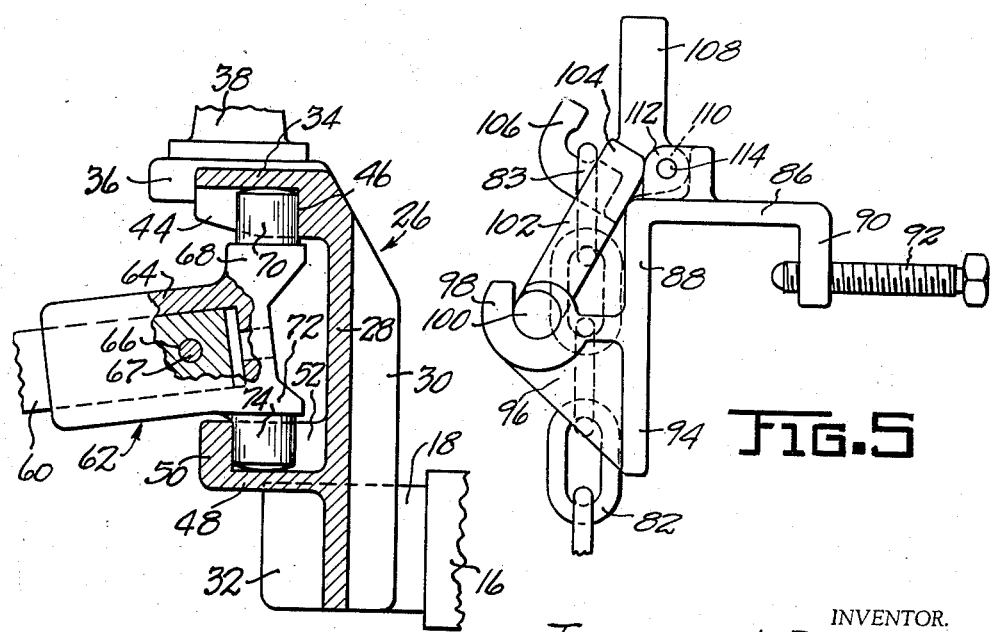
INVENTOR.
TERRELL J. REESE
BY
Eugene C. Knoblock
ATTORNEY

United States Patent Office 2,952,475
Patented Sept. 13, 1960

2,952,475

LOAD TRANSFERRING TRAILER HITCH

Terrell J. Reese, 4013 Cassopolis St., Elkhart, Ind.

Filed Nov. 24, 1958, Ser. No. 776,117

3 Claims. (Cl. 280—406)

This invention relates to improvements in load transferring trailer hitches. More particularly, it relates to a device functioning to connect a trailer to a tractor and serving to transmit part of the load from the trailer to the front wheels of the tractor and thereby distribute the weight transmitted by the trailer to the tractor to both the front and the rear wheels of the tractor. This invention is an improvement upon the devices covered by my prior Patents 2,729,467, dated January 3, 1956, and 2,808,272, dated October 1, 1957, and incorporates substantially the same advantages as the devices of said prior patents.

The primary object of this invention is to provide a novel, simple, inexpensive device of this character wherein the resilient members utilized constitute spring steel bars which are detachably connected with associated parts in a manner to accommodate ready installation and removal thereof and pivoting thereof as required to accommodate turning of a tractor-trailer combination vehicle and which bars further are characterized by a mounting accommodating reversal thereof to counteract the set which the same may take in use.

A further object is to provide a device of this character having novel means for connecting an elongated spring steel bar with a trailer frame so as to accommodate ready connection and disconnection of the parts to accommodate relative movement between the frame and the spring bar as required to permit turning of the tractor-trailer combination and to provide simple manually actuable means for stressing a spring bar for locking the same in stressed position.

Other objects will be apparent from the following specification.

In the drawings:

Fig. 1 is a fragmentary top plan view of my new load transferring trailer hitch;

Fig. 2 is a view of my new trailer hitch in side elevation;

Fig. 3 is an enlarged fragmentary detail plan view of a part or detail of my device;

Fig. 4 is a fragmentary enlarged side view of the part shown in Fig. 3, with parts thereof shown in section taken on line 4—4 of Fig. 3; and Fig. 5 is an end view of the spring-tensioning part of my device.

Referring to the drawings which illustrate the preferred embodiment of the invention, the numeral 10 designates an elongated rigid tubular member which is preferably of square or other non-circular cross-sectional shape. The member 10 telescopically mounts or receives a tube or bar 12 of suitable length and strength. The members 10 and 12 constitute parts of a carrier which are adapted to be secured at longitudinally spaced points to the frame or chassis of a tractive motor vehicle, such as an automobile or a truck in fixed relation thereto and in such manner as to transmit stress acting upon the free or outer end of the carrier to the tractor frame at longitudinally spaced points thereof. If desired, the parts 10 and 12 may be secured in selected longitudinal adjustment although said parts may have a simple snug telescopic fit, one within the other, and each may be fixed by connection thereof to the tractor by suitable securing means at selected points thereof. In the form shown, the carrier tube 10 mounts a pair of spaced laterally projecting brackets or plates 14, to which is fixedly secured, in offset and preferably parallel relation to the tube 10, a rigid tube 16 projecting beyond the end of the tube 10 and preferably of square or other non-circular cross-section.

A rigid elongated bar 18 has a snug telescopic fit in the tube 16 and is provided with one or more transverse apertures therein adapted to register with apertures in opposed walls of the tube 16 to receive a pin or other securing member 20 preferably of L-shape so as to provide a laterally projecting handle 22 at one end thereof and preferably apertured at its opposite end to receive a resilient retainer member 24. A hitch ball bracket 26 is welded or otherwise fixedly secured to the outer or free end of the bar 18 and preferably projects vertically therefrom. The hitch ball bracket 26 is preferably an integral metal casting and includes a vertical transverse plate portion 28 reinforced by vertical forwardly projecting spaced symmetrically positioned flanges 30 and rearwardly projecting flanges 32 coplanar with the flanges 30. The lower central portion of the plate 28 is preferably cut away to receive the bar 18, and the spacing of the inner faces of flanges 30 and 32 is preferably substantially equal to the width of the bar 18 so that the flanges 30 and 32 provide parts to which the bar 18 may be welded or otherwise fixedly secured. The bracket 26 includes an integral top wall portion 34 extending rearwardly from plate 28 and having a central portion 36 adapted to support and securely mount the shank portion 38 of a kingpin 40 of a trailer hitch at an aperture 42 in said central plate portion 36. The center or axis of the aperture 42 and of the kingpin will preferably intersect the axis of the bar 18 and of the tubes 10 and 16.

Each of the opposite side portions of the top wall 34 are provided at the bottom faces thereof with elongated longitudinally extending slots 44 open at the rear edge of the wall 34 and terminating at an abutment shoulder 46 preferably spaced rearwardly from the front wall 28.

Each ball bracket has a pair of integral socket members projecting rearwardly from the wall 28 and outwardly from each wall 32 in vertically spaced relation below the top wall portion 34. Each socket portion has a bottom wall 48, a rear upwardly projecting wall 50 and spaced inner and outer upwardly projecting side walls 52 providing a socket or longitudinally elongated groove whose longitudinal axis is preferably in substantially the same plane as the longitudinal axis of the groove 44 of one side portion of the upper wall 34. The grooves 44, the sockets 48 at opposite sides of the hitch ball bracket are equally spaced laterally from a longitudinal vertical plane passing through the axes of the kingpin 40 and the bar 18.

An elongated spring unit of cantilever type is detachably and pivotally carried by the hitch ball bracket 26 at each side thereof. This cantilevered spring unit includes an elongated spring steel bar 60 which is normally straight and may be of any desired configuration, such as a longitudinally tapered shape, as illustrated in Fig. 2. Each spring bar 60 is carried by a rigid pivot carrier 62. Each pivot carrier 62 includes a socket portion 64 which is preferably elongated and tubular and has a bore of a cross-section similar to and of a size to snugly and non-rotatably receive an end portion of the spring bar 60. The length of the end portion of the spring bar fitting within the socket 54 is preferably substantially greater than the diameter or cross-sectional dimension of the spring bar, as best seen in Fig. 4. The front end portion of each spring bar 60 fitting within the socket 54 has a transverse aperture 66 which is adapted to register with apertures in the socket 64 to receive a pin or other anchoring member 67 which preferably is detachably or removably mounted in said apertures and which may be of a construction similar to the pin 20 described above, or of any other construction found suitable. An upwardly projecting part 68 is formed integrally with the spring carrier 62 and, in turn, carries a cylindrical pin portion 70. An enlargement 72 at the lower portion of the spring carrier 62 has projecting downwardly therefrom a pin portion 74.

The projecting pin portions 70, 74 are preferably coaxial, and the axis thereof preferably extends at an angle to the axis of the socket portion 64, as best seen in Fig. 4. The pin 74 is of a diameter substantially equal to the spacing between the side walls 52 of the socket or recess of the socket member 48, and the diameter of the pin portion 70 is preferably substantially equal to the width of the groove 44. Consequently, the pins 70 and 74 constitute hinge pins which permit rotation of the cantilever spring unit when properly assemblied in the bracket 26, as illustrated in Fig. 4. The pins 70 and 74 can be installed without requiring the use of any securing means, and can likewise be rapidly removed from said socket members. Removal is accomplished by tilting the cantilevered spring unit counterclockwise, as viewed in Fig. 4, so as to withdraw the upper pin 70 from its receiving slot 44, whereupon the lower pin 74 can be lifted clear of its receiving socket. Installation or assembly of the parts is accomplished in the reverse manner and entails holding of the spring assembly in a vertically tilted position with the spring carrier 62 uppermost. The pin 74 is then inserted in the recess of the socket member 48, following which the elongated spring unit is shifted toward horizontal position with the upper pin 70 being guided to enter the slot 44. It will be observed that in operative position the pin 70 abuts against the shoulder 46 of the top wall 34, and the pin 74 abuts against the rear or outer wall 50 of the socket member 48.

The opposite or free end of the spring bar 60 carries an eyelet or suitable retainer 78 which pivotally mounts one end link 80 of a multiple link chain 82 whose opposite end is adapted for releasable connection with a spring-tensioning chain lifting unit of the construction best illustrated in Figs. 2 and 5, and which is preferably mounted by a part of the frame of the trailer to be connected to the tractor by means of the present hitch as to a structural member constituting a part of the A-frame of a trailer normally projecting forwardly from the trailer and serving to mount a socket member (not shown) cooperating with the hitch ball 40 to serve as a means for pulling the trailer from the tractor.

The chain lifter includes a bracket adapted to be mounted upon the trailer frame and here illustrated as including a top part 86 adapted to bear upon the trailer frame, a side wall 88 adapted to bear against the side wall of the trailer frame, and a rigid frame 90 provided with a screw-threaded aperture to receive a set screw 92 adapted to be threaded into engagement with the surface of the frame member (not shown) opposite that which bears against the wall 88. The vertical wall 88 includes laterally spaced depending portions 94 having outwardly projecting flanges 96 which terminate in socket portions 98 laterally spaced to journal the opposite end portions 100 of a rigid arched member having opposed leg portions 102 carrying the pins 100 and a transverse portion 104 which carries a forwardly projecting hook 106 adapted to releasably engage a selected link 83 of the chain 82. The handle portion 108 projects from part 104 and has a projection 110 fitting between spaced flanges 112 projecting from the bracket part 86 adjacent the bracket wall 88. The parts 110 and 112 are apertured to receive releasably a retainer pin 114.

The chain lifter lever unit 102, 104, 106 and 108 is pivoted by the pins 100 thereof on an axis spaced from the bracket part 88 a substantial distance so that the lift part 102 is inclined, as illustrated in Fig. 5, when in operative position and locked in place by the retainer pin 114. This positions the chain 82 overcenter and assists in locking it in place as a result of the flexure of the spring bar 60 resulting from the spring lifting operation. Tension on the spring bar is released by moving the retainer pin 114 and swinging the chain lifted lever 102 counterclockwise, as viewed in Fig. 5, by a pull exerted upon the handle portion 108. After the level passes center, the pivotal movement occurs freely and the chain may be easily disengaged from the hook 106 for disconnection of the parts, as for replacement of a spring bar 60 or reversal thereof. Likewise retensioning of the spring bar 68 is accomplished easily by engaging the proper link 83 of the chain 82 in the hook 106 while the lever 102 depends from or is at a position lower relative to the mounting bracket 86, 88. When the chain has been interconnected with the lever, the lever can be swung toward the spring-tensioning position shown in Fig. 5, passing the chain over center as is accommodated by the arched shape of the bifurcated lever and the spacing of the links 102 thereof.

This device permits ready disconnection of a tractor and trailer unit by disengagement of the chains 82 from the chain-lifting brackets and by withdrawal of the connector bar pin 20 between the bar 18 and the tube 16. It will be understood, of course, that the connection between the trailer hitch and the kingpin can then readily be effected. This permits the hitch unit to be totally disconnected and separated from both tractor and trailer as far as exposed or connecting parts are considered. In this connection it will be apparent that the tube 16 may be mounted in a position to be substantially concealed or be protected with respect to the rear bumper alongside which the bracket 26 projects in the normal operative position of the parts. Reconnection of the parts can be effected by inserting the bar 18 into the tube 16 and locking the same in place by the pin 20, following which the tractor vehicle can be maneuvered into operative relation to the trailer to permit connection of a hitch at the hitch ball 40 when the weight of the front end of the trailer will be transmitted to the frame of the vehicle only at the hitch ball so that the weight of the trailer must be supported by the rear of the tractive vehicle. However, when the chains 82 are connected to the chain lifter units and the latter is operated to the position shown in Fig. 5 to tension the chains, the springs 86 will be flexed and a level established between the frame of the tractive vehicle and the part of the trailer which is normally supported by the tractive vehicle in such manner as to transmit a part of the weight of the trailer to the front wheels of the tractive vehicle and thereby distribute the transmitted part of the weight of the trailer between the front and rear wheels of the tractive vehicle. This is important from the standpoint of providing the driver of the tractive vehicle with sufficient traction upon the front or steering wheels of that vehicle to insure that he has full control of the tractor-trailer combination for steering purposes at all times and to insure that vertical jouncing of the trailer does not subject the rear springs only of the tractive vehicle to the loaded condition.

In view of the fact that the chain forms a flexible spring suspension and tensioning member, and the further fact that the pins 70 and 74 are free to rotate relative to the spring-mounting socket or bracket members, no resistance to pivoting of the tractor relative to the trailer in turning corners occurs. Thus the device does not materially resist side sway or weaving of the tractor at the hitch itself as in my prior Patent No. 2,808,272. However, since the hitch does apply a part of the weight of the front of the trailer to the front wheels of the tractor, the tractor is steadied and full driving or steering control thereof is preserved so that under normal traveling conditions, and in the absence of any intentional manipulation of the steering gear to produce side sway, there will be no substantial tendency of the trailer to weave laterally as it is towed by the tractor.

While the preferred embodiment of the invention has been illustrated and described, it will be understood that changes in the construction may be made within the scope of the appended claims without departing from the spirit of the invention.

I claim:

1. A trailer hitch comprising an elongated rigid unit adapted to be mounted in fixed position on the frame of a vehicle and including a hitch ball bracket, a pair of elongated cantilever spring bars each pivoted about a substantially vertical axis to said bracket, flexible suspension means connected to the free end of each spring bar, and spring lift means adapted to be mounted on the frame of a trailer and including means for detachable connection with said suspension means, each spring bar fixedly carrying at one end thereof a pair of rigid axially aligned substantially vertical upper and lower pivot pins, said bracket including a socket releasably mounting said lower pin and a groove open at its rear end releasably receiving said upper pin.

2. A trailer hitch comprising an elongated rigid unit adapted to be mounted in fixed position on the frame of a vehicle and including a hitch ball bracket, a pair of elongated cantilever spring bars each pivoted about a substantially vertical axis to said bracket, flexible suspension means connected to the free end of each spring bar, and spring lift means adapted to be mounted on the frame of a trailer and including means for detachable connection with said suspension means, each spring bar fixedly carrying at one end thereof a pair of rigid axially aligned substantially vertical upper and lower pivot pins, said bracket including a longitudinally elongated recess receiving said lower pin and including a rear pin-confining abutment and a groove spaced above said socket and open at its rear end to receive said upper pin, said groove having a front abutment longitudinally offset from said first named abutment.

3. A trailer hitch comprising a rigid unit adapted to be mounted on the frame of a vehicle and including a hitch ball bracket, a pair of elongated cantilever spring bars each pivoted about a substantially vertical axis to said bracket, flexible suspension means connected to the free end of each spring bar, and spring lift means adapted to be mounted on the frame of a trailer and including means for detachable connection with said suspension means, each spring bar carrying at one end thereof a pair of rigid axially aligned substantially vertical upper and lower pivot pins, said bracket including a substantially vertical transverse plate, an integral top plate projecting rearwardly from said vertical plate and having a pair of elongated longitudinal laterally spaced upper-pin-receiving slots on its bottom face open at the rear edge thereof, and a pair of longitudinally elongated lower-pin-receiving sockets projecting rearwardly from said vertical plate below said slots and each having pin-confining side and rear walls and a bottom wall.

References Cited in the file of this patent

UNITED STATES PATENTS

| | | |
|---|---|---|
| 2,597,657 | Mathisen | May 20, 1952 |
| 2,793,879 | Bair | May 28, 1957 |
| 2,817,541 | Mathisen | Dec. 24, 1957 |
| 2,828,143 | Da Vatz | Mar. 25, 1958 |